May 28, 1963  J. P. ZALLEA  3,091,025
METHOD OF MANUFACTURING EXPANSION JOINTS
Filed May 20, 1958  4 Sheets-Sheet 3
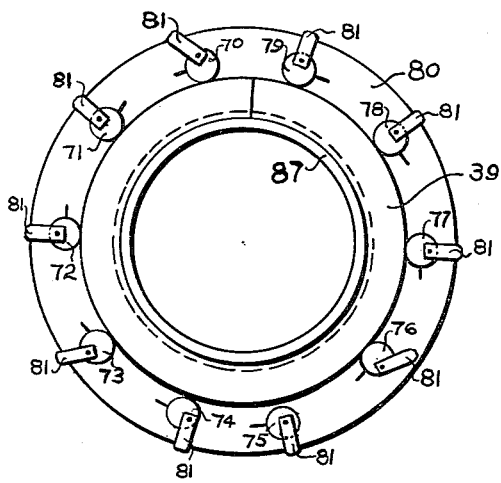
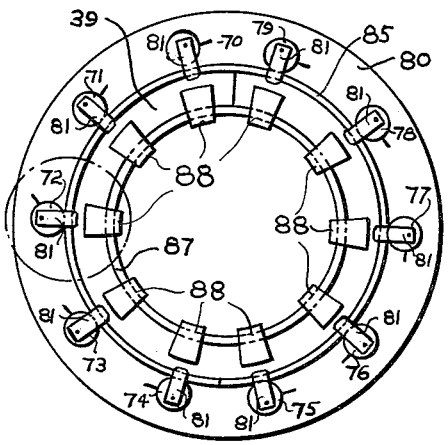
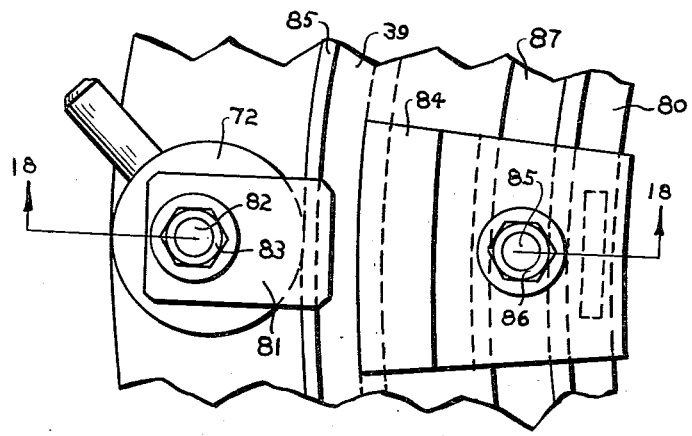
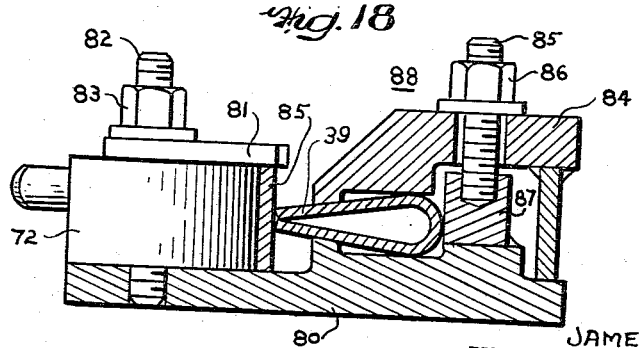
INVENTOR.
JAMES P. ZALLEA
BY
Leo Edelson
ATTORNEY May 28, 1963
J. P. ZALLEA
3,091,025
METHOD OF MANUFACTURING EXPANSION JOINTS
Filed May 20, 1958
4 Sheets-Sheet 4
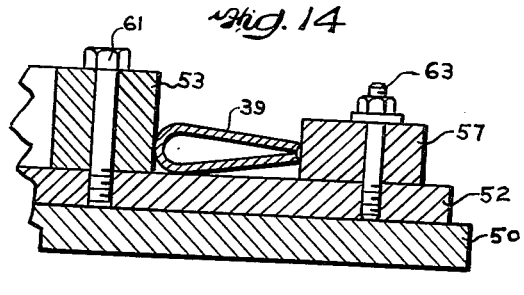
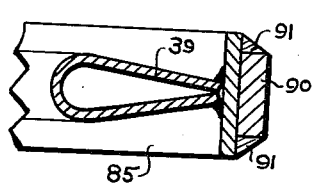
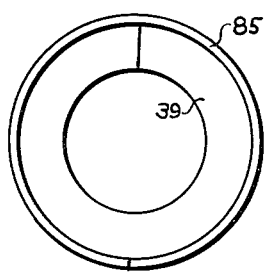
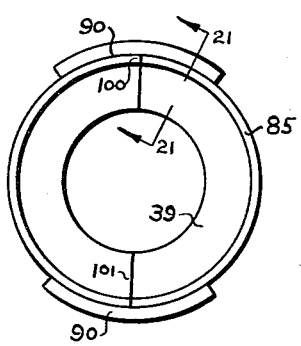
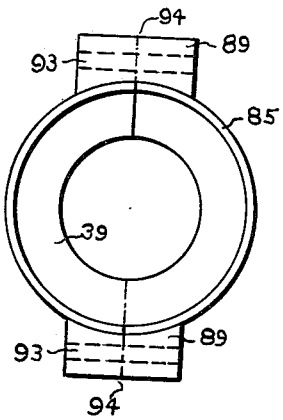
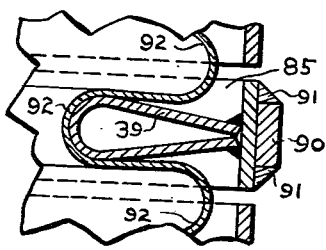
INVENTOR.
JAMES P. ZALLEA
BY
Leon Edelson
ATTORNEY United States Patent Office 3,091,025
Patented May 28, 1963

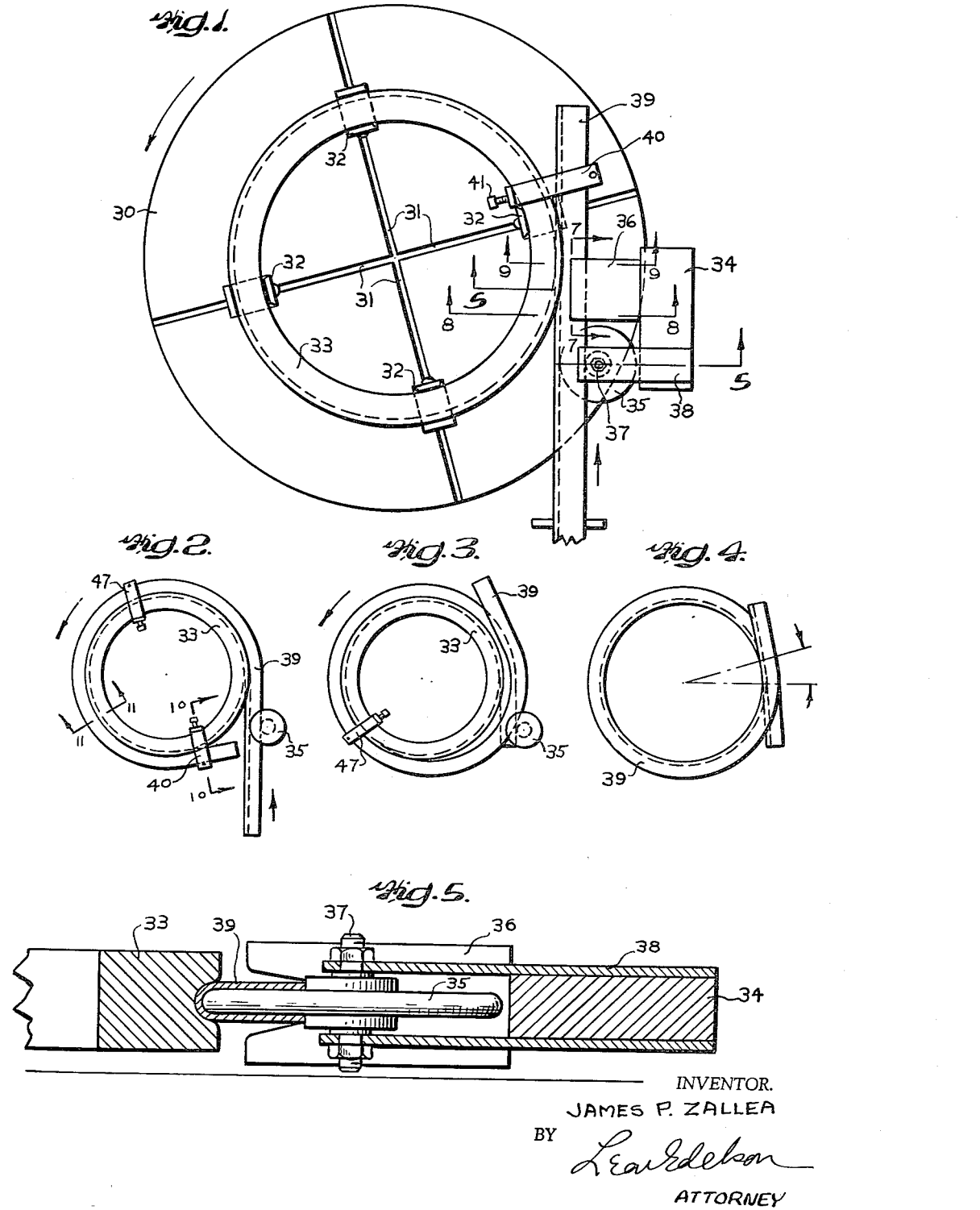

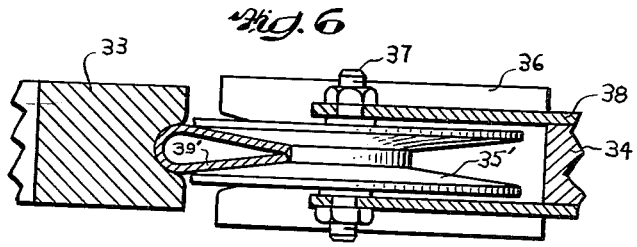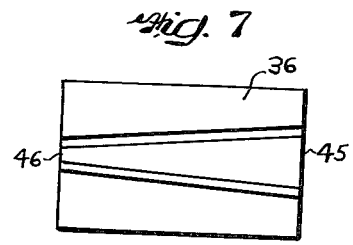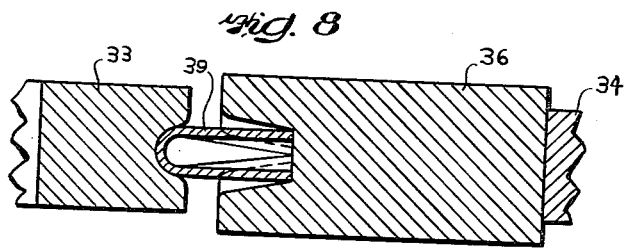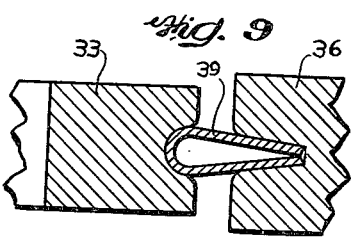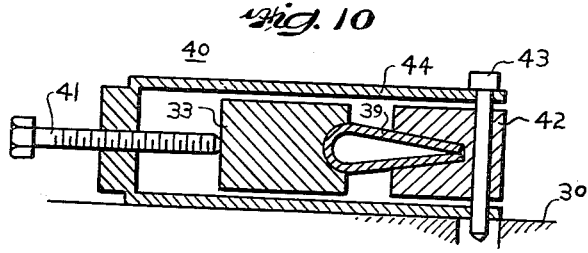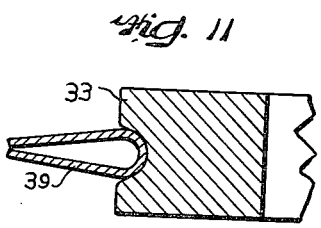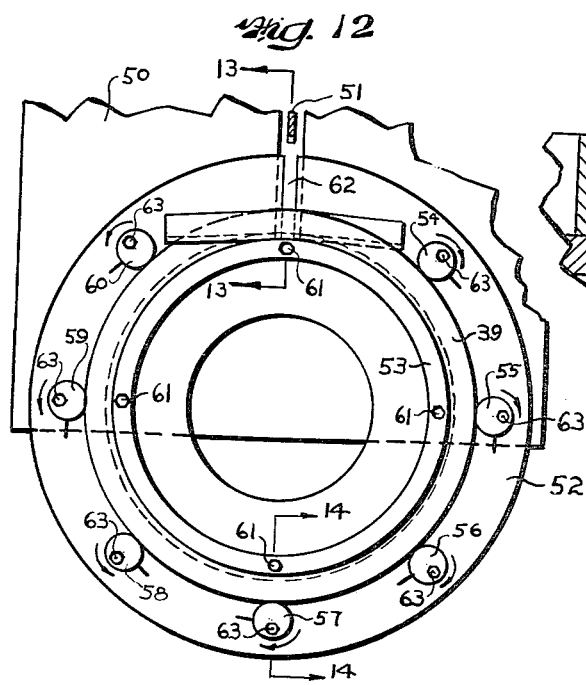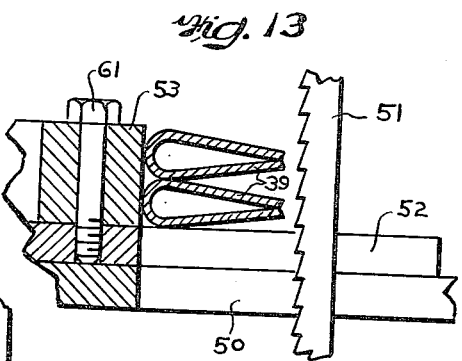

3,091,025
METHOD OF MANUFACTURING EXPANSION JOINTS
James P. Zallea, Wilmington, Del., assignor, by mesne assignments, to Zallea Brothers, Inc., Wilmington, Del., a corporation of Delaware
Filed May 20, 1958, Ser. No. 736,605
18 Claims. (Cl. 29—411)

This invention relates to apparatus for and the method of fabricating hollow equalizing rings for use with self-equalizing expansion joints, and more particularly to equalizing rings of the type described in my co-pending application Serial No. 643,747, filed March 4, 1957, and now abandoned, of which this is a continuation in part.

A principal object of this invention is to provide a method of fabricating equalizing rings that have a minimum of circumferentially extending welds.

Another object of this invention is to provide a method of fabricating equalizing rings which comprise a pair of hollow one-piece semi-circular sections that conjointly form a hollow toroid.

Still another object of this invention is to facilitate the manufacture of the equalizing rings by a method which involves a minimum number of fabricating operations, thereby enabling the rings to be formed from a minimum number of parts.

These and other objects and advantages of my invention will become apparent to those persons normally skilled in the art from a careful reading of the following specifications and the accompanying drawings, wherein:

FIGURE 1 illustrates the apparatus for bending channel or tear-drop cross-section stock into a hollow annulus.

FIGURES 2, 3, and 4 illustrate various stages of the annulus forming process.

FIGURE 5 illustrates a sectional view taken along the lines 5—5 of FIGURE 1, some parts being shown in section and other parts in elevation.

FIGURE 6 is an alternative showing to that of FIGURE 5 illustrating a part of the forming apparatus employed where the stock to be rolled is of tear-drop cross-section rather than open channel.

FIGURE 7 is a view taken along the lines 7—7 of FIGURE 1 illustrating a forming block which is used to transform open channel stock to a tear-drop cross-section just prior to the actual bending operation.

FIGURE 8 is a sectional view taken along the lines 8—8 of FIGURE 1 illustrating open channel stock being transformed into the tear-drop cross-section by means of the forming block of FIGURE 7.

FIGURE 9 is a sectional view taken along the lines 9—9 of FIGURE 1 illustrating the completion of the tear-drop forming operation from the open channel stock.

FIGURE 10 is a sectional view taken along the lines 10—10 of FIGURE 2 illustrating a typical clamping mechanism for securing the rolled stock to a ring forming die.

FIGURE 11 is a section view taken along the lines 11—11 of FIGURE 2.

FIGURE 12 is a plan view of apparatus for cutting to size a rolled annulus such as that illustrated in FIGURE 4.

FIGURE 13 is a view taken along the lines 13—13 of FIGURE 12.

FIGURE 14 is a sectional view taken along the lines 14—14 of FIGURE 12.

FIGURE 15 is a plan view of apparatus for positioning the sized annulus on a welding jig.

FIGURE 16 illustrates the apparatus of FIGURE 14 with the annulus clamped in place and the outer band in position for welding thereto.

FIGURE 17 is a detailed view of the apparatus within the phantom circle of FIGURE 16.

FIGURE 18 is a view taken along the lines 18—18 of FIGURE 17, some parts being shown in section and others in elevation.

FIGURE 19 illustrates a completed equalizing ring after demounting from the welding jig illustrated in FIGURE 16.

FIGURE 20 illustrates the equalizing ring of FIGURE 19 which has been split into two semi-circular sections and has had butt straps fillet welded to the outer band.

FIGURE 21 illustrates a cross-sectional view of a finished equalizing ring showing a butt strap fillet welded to the outer band. This sectional view is taken along the lines 21—21 of FIGURE 20.

FIGURE 22 illustrates a split equalizing ring which has a pair of bolting lugs welded to the outer band.

FIGURE 23 is a sectional view illustrating an equalizing ring in place about a bellows expansion joint.

In the various views like elements are denoted by like reference characters.

Briefly, the method of making the equalizing rings includes three essentially separate operations. The first of these operations is a roll forming procedure in which a piece of straight stock is formed into an annulus, and details of this portion of the fabrication method are illustrated in the first 11 figures of the drawings. The second part of the fabrication method deals with the operations of sizing and cutting the annulus to prepare the latter for welding to an outer band which, with the annulus forms the T-shaped equalizing ring, the details of which are illustrated in connection with FIGURES 12 through 14. The third part of the fabrication deals with the welding of the outer band to the rolled annulus and will be described in connection with FIGURES 15 through 18. Turn now to an examination of the FIGURES 1 through 11 for an understanding of the process of roll forming straight stock into an annulus.

FIGURE 1 illustrates the apparatus used in the roll forming process. The basic apparatus required for this roll forming operation is a slow speed power driven table capable of rotation in a horizontal plane. A vertical boring mill or turret lathe with a table size large enough to accommodate the annulus diameter desired has been found to operate satisfactorily with table rotation speeds in the range of approximately one to three revolutions per minute. In FIGURE 1 this table is illustrated as the table 30. The table 30 is cross-slotted as at 31, and radially slidably fitted into these slots 31 are four adjustable-jaw chucks 32. The chucks 32 clamp a circular die 33 to the surface of the rotatable table 30. The outer surface of the die 33 is recessed to properly receive the curved surface portion of the straight stock which is to be bent into the annular shape; this die cross-section is clearly illustrated in FIGURES 5 and 6, and FIGURES 8 through 11.

At the right-hand side of FIGURE 1 is shown a tool holder 34 which has rigidly mounted thereto a guide wheel 35 and a forming block 36. The central working portions of the guide wheel 35, the forming block 36, and the die 33 all lie in a common horizontal plane. The guide wheel 35 is mounted on a shaft 37 which is fixed to a bracket 38 for rigid securement to the tool holder 34. The guide wheel 35 is rotatable freely about the shaft 37 and is shaped to a cross-section to suit the stock to be rolled. For example, FIGURE 5 illustrates a guide wheel of proper cross-section for use with open channel U-shaped stock, whereas FIGURE 6 illustrates a guide wheel 35' of proper cross-section for guiding stock of tear-drop or closed U cross-section. The forming block 36 is attached to the tool holder 34 so that it faces the rolling die 33 at approximately the point of contact of the latter with the stock to be rolled. The function of the forming block 36 is to guide the stock accurately into the recess in the rolling die 33 and also, if open channel stock is being used to form the latter to a tear-drop cross-section just prior to bending. The forming block 36 may be seen in various views in FIGURES 5 through 9, to which later reference will be made.

The tool holder 34 is designed to permit adjustment in both the horizontal and vertical directions so that the guide wheel 35 and forming block 36 may be accurately located with respect to the recess in the rolling die 33, and also to allow the guide wheel 35 and forming block 36 to be retracted for easy installation and removal of the material to be rolled.

The stock 39 for forming into the rolled annular ring is initially in the form of a straight length of U-shaped or tear-drop shaped channel which has been previously roll formed from carbon steel strip or sheet. With the tool holder 34 and attached guide wheel 35 and forming block 36 retracted, the stock 39 is entered into the recess on the die 33 and a clamp 40 is loosely mounted to secure the stock 39 to the rolling die 33. The tool holder 34 is now moved into position with the channel legs inserted into the guide block 36 and the guide wheel 35 in engagement with the stock, as illustrated in FIGURE 1.

If the stock 39 is of open or U-shaped channel cross-section, a short section at the leading end of the stock 39 must be closed to a tear-drop or ovoid cross-sectional shape in a vise or press prior to the aforedescribed initial set-up operation. This tear-drop forming of the leading edge of the stock 39 is necessary so that the guide block 36 may be moved into its working position and so that the clamp 40 may be secured. This will be most clearly seen from a reference to FIGURES 7 and 10 which respectively illustrate the forming block 36 and clamp 40. Referring first to FIGURE 7, it is seen that right-hand edge 45, which is proximate the guide wheel 35, is apertured to a width sufficient to accommodate the open U channel stock, but that the left-hand edge 46 is apertured to a much smaller width sufficient only to accommodate a tear-drop cross-section piece of stock. Since this is so, a portion of the stock 39 must be tear-dropped for a sufficient distance from its leading end so that it may be accommodated within the narrow apertured end 46 of the forming block 36. Referring now to FIGURE 10, it is seen that the clamp 40 includes a generally U-shaped yoke portion 44 surrounding the rolling die 33 and extending therebeyond, a V-shaped-recessed block 42, a pin 43, for locking the block 42 to the yoke 44, and a bolt 41 threaded through the yoke 44 and bearing against the inside of the rolling die 33 for pulling the block 42 toward the rolling die 33 and thereby clamping the stock 39. The V-shaped-recess in the block 42 is required so that the stock 39 of tear-drop cross-section at its leading end may be securely clamped.

FIGURE 5 illustrates the form of the guide wheel 35 which is employed with the open or U-shaped cross-sectional stock. It is seen therein that the guide wheel 35 is of a rounded edge disc shape so that it nests closely within the U-shaped stock. If, on the other hand, closed U or ovoid shaped stock is used, there is no necessity for tear-dropping the short section at the leading end of the stock since the ovoid cross-section is readily accommodated by the narrow apertured end 46 of the forming block 36, and the block 42 of clamp 40. The only modification to the apparatus required with this stock shape is the substitution of the guide wheel 35' illustrated in FIGURE 6 for the guide wheel 35 illustrated in FIGURE 5.

With the tool holder 34 set into its working position the stock 39 is tangent to the die 33, nesting within the recess therein. The clamp 40 is now drawn up tightly by means of the bolt 41 which thereby rigidly fixes the leading end of the stock 39 to the die 33. The table 30 is now rotated slowly in a counterclockwise direction and the stock 39 is ring formed about its longtudinal sectional axis by the bending moments set-up between the clamp 40, the rolling die 33, and the guide wheel 35. The clamp 40 and guide wheel 35 of course must be of sufficient strength to resist these bending moments. During the rotation of the table 30, the forming block 36 guides the stock 39 and prevents cocking or twisting of the latter during forming. In the event that open or U-shaped stock is being formed, the tapering sides of the forming block 36 close the open stock to the desired ovoid shape by a pressing action on the opposed open legs of the U-shaped stock. This forming action is clearly illustrated in the showing of FIGURE 8.

Referring now to FIGURE 2, it will be seen that after the table 30 has rotated through about 270 degrees, the clamp 40 and the leading end of the stock 39 tend to interfere with a continuation of the forming operation by approaching butting relation with the remaining straight stock which has not yet passed beyond the guide wheel 35. A second clamp 47, identical to the clamp 40 is now attached to the stock 39 and rolling die 33 as indicated in FIGURE 2. The first clamp 40 is now removed with the consequent freeing of the leading end of the stock 39. With approximately 180 degrees of the formed ring free of the die 33, the leading edge may be readily displaced and lapped over the remaining portion of the straight stock 39, rotation of the table 30 then being resumed until the full circle has been formed.

The length of the stock 39 must be such that a full circle may be rolled before the trailing end of the straight stock passes beyond the guide wheel 35, this being illustrated in FIGURE 3. The tool holder 34 is now retracted thus disengaging the guide wheel 35 and forming block 36 from the rolled annulus, the clamp 47 is removed and the annulus disengaged from the rolling die 33. The resulting annulus includes sufficient overlap of the end portions to permit a sizing and cutting operation and is illustrated in FIGURE 4.

The diameter of the annulus illustrated in FIGURE 4 is determined by the diameter of the rolling die 33 and what may be called "spring-back" or the increase in diameter due to the elasticity of the metal stock. The rolling die diameter and the spring-back characteristic are interdependent, and in order to accurately control the finished size of the rolled annulus the relationship between diameter and spring-back for the material being formed must be known. A large diameter annulus undergoes less deformation during the forming process than does an annulus of smaller size, and therefore has a more elastic spring-back. In the rolling of a small annulus, the spring-back may be very slight, and in some cases so small that the formed annulus cannot be removed from the die. In a case such as this, when the spring-back becomes less than twice the radius of the recess in the rolling die 33 the latter must be made in two sections. These two sections are of a form which would be obtained by splitting the rolling die 33 in a horizontal plane through the root of the recess therein. These sections are bolted together prior to the start of the forming operation and unbolted subsequent thereto so that the upper section may be removed and the annulus released.

The rolled annulus of FIGURE 4 is now ready to have its overlapping straight ends cut off and to have its inside diameter accurately sized. A metal cutting band-saw may be used for the cutting operation in conjunction with a special jig upon which the annulus of FIGURE 4 is mounted. Such a jig is shown in FIGURE 12, as is also a metal cutting band-saw having a table 50 and a saw blade 51. The jig consists of a base plate 52 upon which is mounted a ring 53 having an accurately machined outside circumference conforming to the desired finished inside diameter of the annulus. A slot 62 is cut into the base plate 52 and is aligned with the slot in the band-saw table 50 to permit free passage of the saw blade 51 inwardly for cutting the rolled annulus 39.

The uncut annulus is placed on the base plate 52 around the sizing ring 53 with the overlapping end sections centered on the slot 62. In order to secure the rolled annulus firmly in position and to insure close conformity to the outer machined surface of the sizing ring 53, a set of eccentric cams 54 through 60 are employed, these cams being rotatably secured to the base plate 52 by bolts 63. The cams 54 through 60 are so arranged that the direction of the friction forces exerted on the annulus by each cam is always toward the free end of the ring, thereby forcing any excess material into the straight scrap sections. It will be observed that the cams 54 through 57 are all tightened in a clockwise rotational direction whereas the cams 58, 59, and 60 are tightened in a counterclockwise rotational direction. A proper cam tightening sequence in order to insure close conformity of the annulus to the sizing ring 53 would be as follows; first, tighten the cam 57 and then tighten the remaining cams in pairs beginning with the pair 56 and 58, followed by the pair 55 and 59, and finally the pair 54 and 60. Once the cams have been tightened a check may be made with a feeler gage for excessive clearance between the sizing ring 53 and the annulus 59, and if sufficiently close conformity between the two exists a clean straight saw cut through the overlapped ends is made by moving the saw blade 51 inwardly through the slot 62 and into cutting engagement with the overlapped ends. When the cut has been completed, the sized and cut annulus 39 is removed from the sizing and cutting jig by releasing the cams 54 through 60. The sized and cut annulus is now in the form of a hollow toroid and is ready for the welding of a band to the outside diameter to form the finished T-shaped self-equalizing ring.

After removing the sized and cut annulus from the cutting jig, it is placed in a welding jig such as that shown in FIGURES 15 through 18. Referring first to FIGURE 15, there is seen a fixture 80 having a vertically extending back-stopping section 87 of circular configuration which conforms to the desired inner diameter of the hollow toroid 39. The relationship of the toroid 39 to the fixture 80 and the various other component parts of the welding jig will be best understood by reference to FIGURES 17 and 18, although the method of set-up for welding will be described in connection with FIGURES 15 and 16.

The toroid 39 having been placed upon the fixture 80 with its inside diameter surrounding the vertically extending portion 87, the elliptical cams 70 through 79 are employed to set-up the toroid 39 for the welding operation. All of the cams 70 through 79 excepting the cams 70 and 75 may be brought into engagement with the toroid 39 by clockwise rotation. The two cams 70 and 75 are brought into engagement by counterclockwise rotation. The cam 70 is utilized with the remaining cams excepting 75 to initially clamp the toroid 39 to the welding fixture, whereas the cam 75 is used with the remaining cams excepting cam 70 to clamp the outer band 85 around the toroid 39 for welding thereto.

The first operation, which involves the clamping of the toroid to the fixture 80 is performed as follows. With the toroid 39 in position as previously described, the cam 70 is rotated counterclockwise into clamping engagement, thus tending to push the toroid 39 in a clockwise direction. The cams 71 through 79, excepting cam 75, are then successively tightened by clockwise rotation. This successive tightening operation forces the free end of the toroid 39 in a counterclockwise direction, thereby causing it to conform closely to the back-stopping portion 87 of the fixture 80. The ends of the toroid 39 are thus brought into butting engagement.

With the toroid 39 so cammed, a plurality of segment clamps 88 are secured to the fixture 80 in clamping engagement with the toroid. As best seen in FIGURE 18, the segment clamps 88 comprise a formed metal portion 84 and a bolt 85 and nut 86. The formed metal portion 84 is so shaped in relationship to fixture 80 and the toroid 39 as to securely clamp the latter into the desired position as shown. The formed metal portion 84 is securely fastened to the vertical backing portion 87 of the fixture 80 by the bolt 85 and nut 86. With the toroid 39 securely clamped to the fixture 80 by the segment clamps 88, the engaged ones of the eccentric cams 70 through 79 may be released so that the band 85 may be placed in welding position against the outer circumference of the toroid. The relative positions of the band 85 and the toroid 39 are best seen in the cross-sectional view of FIGURE 18.

It will be observed from FIGURE 16 that whereas the ends of the toroid 39 are buttingly engaged between the eccentric cams 70 and 79, the butting ends of the band 85 are positioned between the eccentric cams 74 and 75. With the band 85 positioned as shown in FIGURE 16, the eccentric cams are again employed to bring the band 85 into close conformance with the outer circumference of the toroid. This is accomplished by first tightening the formerly unused eccentric cam 75 by counterclockwise rotation. The remaining cams are then tightened by clockwise rotation, tightening in order the cams 76 through 79 and then the cams 71 through 74. It should be noted that the cam 70 remains disengaged during this operation. The band 85 is properly vertically positioned by means of the clamping plates 81 affixed to the top of the eccentric cams 70 through 79 by tightening the nut 83 downwardly on the bolt 82 which secures each of the cams to the fixture 80. As before, these details are best seen in the views of FIGURES 17 and 18.

With the hollow toroid 39 and the band 85 properly positioned and securely clamped, long tack welds are made between the segment clamps 88 to secure the band 85 to the toroid 39. The toroid 39 and band 85 may now be released from the welding jig, turned over, and tack welded on the opposite side. The toroid 39 is now finish welded to the outer band 85 with intermittent welds and this may be done either in the welding jig or after removal from the jig depending upon the heat dissipating ability of the welding jig. It is essential that both sides of the assembly comprising the toroid 39 and the band 85 be tack welded before either side is finish welded or the shrinkage produced by the finish weld will tend to open up the closed edges of the tear-drop section 39 and change its shape. FIGURE 19 illustrates a completed assembly of a toroid 39 and band 85 after removal from the welding jig.

The assembly illustrated in FIGURE 19 may be used either as an equalizing ring or as an end bell in a flange or welding end construction for an expansion joint. If the assembly is to be used as an end bell, the butt joint in the toroid 39 is reinforced by a welded gusset plate on the side which is not in contact with the corrugated bellows element of the expansion joint. If, however, the assembly of FIGURE 19 is to be used as an equalizing ring, it must be first stress relieved and then cut in half to form a pair of symmetrical semi-circular sections. These semi-circular half sections are made by cutting through the outer band 85 in line with the unwelded butt joint in the toroid 39, and by making a second cut 180 degrees away through the butted ends of the outer band and through the toroid. These aligned two cuts through the outer band 85 and the toroid 39 are illustrated in FIGURE 20 as the cuts 100 and 101.

The half-sections may be applied to the corrugated bellows element of an expansion joint to form a complete equalizing ring by means of welded butt straps. A pair of these butt straps 90—90 is illustrated in FIGURE 20. FIGURE 21, which is a sectional view taken along the lines 21—21 of FIGURE 20, shows the butt strap 90 fillet welded to the outer band 85 as by the welds 91—91. FIGURE 23 shows in fragmentary sectional view such an equalizing ring in place about the corrugated bellows element 92 of an expansion joint. The butt strap 90 must be of sufficient cross-section to develop the same strength as the outer band 85, and the length of the fillet welds 91 must be such that the shear strength is equivalent also to the strength of the band 85.

An alternative to the use of welded butt straps 90, and one which allows for demounting of an equalizing ring after it has been installed on the corrugated bellows element of an expansion joint, is illustrated in FIGURE 22. This method provides for the welding of a pair of bolting lugs 89—89 to the assembly of FIGURE 19, in the configuration illustrated in FIGURE 22. Each of the bolting lugs 89 contains a predrilled bolting hole 93. After the bolting lugs 89 have been welded to the outer band 85, the entire assembly is stress relieved and cut in half along the dashed lines 94—94, thus completing the equalizing ring.

It will be understood, of course, that the present invention as hereinbefore described and as shown in the accompanying drawings is susceptible of various changes and modifications which may be made from time to time without departing from the general principles or spirit of the invention, and accordingly it is intended to claim the same broadly as well as specifically, as indicated by the appended claims.

What is claimed as new and useful is:

1. The method of forming an external annular reinforcing and movement limiting unit comprising the step of turning up the longitudinally extending opposite sides of a rectangular sheet metal element into edge-abutting relation to thereby form a substantially straight elongated member of uniform generally ovoid shape in transverse section having an intermediate curved area and a pair of section having an intermediate curved area and a pair of facing flat side wall areas extending convergingly radially outwardly from said intermediate curved wall area, the step of bending said member longitudinally and turning the opposite end portions thereof into opposed relation to thereby form a radially spilt hollow toroid having an intermediate curved wall area extending about the inner periphery thereof, and opposite flat side annular wall areas extending convergingly radially outwardly from said intermediate curved wall area on opposite sides of the median plane of said toroid respectively to meeting engagement to form a pair of narrow edges extending about the outer periphery of said toroid, and the step of fitting said toroid into a circular band and securing the narrow outer peripheral edges thereof to the inner face of said band.

2. The method of forming an external annular reinforcing and movement limiting unit as defined in claim 1 followed by the step of halving said toroid and band along a diameter extending between the opposed end portions of said toroid.

3. The method of forming an external annular reinforcing and movement limiting unit as defined in claim 1 wherein the elongated member of uniform generally ovoid shape in transverse section is formed by initially turning up the longitudinally extending opposite sides of the rectangular sheet metal element to thereby make said element open U-shaped in transverse section, and then by a separate step turning the longitudinally extending opposed wall areas inwardly toward one another into edge-abutting relation to thereby form a member of closed U or tear-drop shape in transverse section.

4. The method of forming an external annular reinforcing and movement limiting unit as defined in claim 1 wherein the elongated member of uniform generally ovoid shape in transverse section is formed by initially turning up the longitudinally extending opposite sides of the rectangular sheet metal element to thereby make said element open U-shaped in transverse section, and then, simultaneously with the step of bending said element longitudinally to form the toroid, the opposed wall areas of the element are turned inwardly toward one another into edge-abutting relation to thereby make said toroid closed U or tear-drop shaped in radial transverse section.

5. The method of making a stress equalizing ring element for use with the corrugated bellows element of an expansion joint, including the steps of, longitudinally bending a one piece substantially straight elongated member of generally uniform ovoid cross-section into a hollow annulus of predetermined inside diameter with adjacent overlapping ends, the hollow annulus so formed having an intermediate curved wall area extending circumferentially about the annulus inner periphery and a pair of facing flat side wall areas extending convergingly radially outwardly from the intermediate curved wall area to meeting engagement to form a pair of narrow edges at the annulus outer periphery, cutting through the overlapping adjacent ends thereby forming a radially split hollow toroid with free ends in closely spaced facing relation, presenting said free ends in registry with each other, and securing a completely circumferentially extending close fitting circular band to the outer periphery of the toroid to form a unitary equalizing ring element.

6. The method of making an installed equalizing ring assembly from the ring element of claim 5 including the steps of strain relieving the ring element and then halving said ring along a diameter between the facing ends of the toroid, installing the half sections around a reduced cross-section portion of a corrugated bellows element, and securing the two halves together with partially circumferentially extending butt straps welded to the outer surface of the circular band across each of the diametral cuts.

7. The method of making an equalizing ring assembly removably securable to the bellows element of an expansion joint from the ring element of claim 5 including the steps of, securing to diametrically opposite outer sides of the circular band a pair of apertured bolting lugs in position to be halved when the ring element is halved, strain relieving the ring element and then halving it along a diameter between the facing ends of the toroid.

8. The method of making the stress equalizing ring element of claim 5 wherein the step of cutting the annulus includes the steps of, clamping the annulus closely around a circular form of the same diameter as that used in the annulus forming step with the ends overlapped, and cutting through both of the overlapped ends along a radius of the annulus.

9. The method of making the stress equalizing ring element of claim 5 wherein the step of securing the circular band to the toroid outer periphery includes the steps of, clamping the cut annulus closely around a circular form of the same diameter as that used in the annulus forming step, forming the circular band by bending the long axis of a rectangular strap around the toroid outer periphery so that the band ends meet at a point substantially diametrically opposite the radial split in the toroid, clamping the band to the toroid in such position that the median planes of the toroid and circular band substantially coincide and the toroid median plane is substantially perpendicular to the inside surface of the circular band, tack welding the circular band to the outer periphery of the toroid on both side walls, and then finish welding the circular band to the outer periphery.

10. The method of making the stress equalizing ring element of claim 5 wherein the step of cutting the annulus includes the steps of, clamping the annulus closely around a circular form of the same diameter as that used in the annulus forming step with the ends overlapped, and cutting through both of the overlapped ends along a radius of the annulus, and wherein the step of securing the circular band to the toroid outer periphery includes the steps of, clamping the cut annulus closely around a circular form of the same diameter as that used in the annulus forming step, forming the circular band by bending the long axis of a rectangular strap around the toroid outer periphery so that the band ends meet at a point substantially diametrically opposite the radial split in the toroid, clamping the band to the toroid in such position that the median planes of the toroid and circular band substantially coincide and the toroid median plane is substantially perpendicular to the inside surface of the circular band, tack welding the circular band to the outer periphery of the toroid on both side walls, and then finish welding the circular band to the outer periphery.

11. The method of making the stress equalizing ring element of claim 5 wherein the step of forming the elongated member into a hollow annulus includes the steps of, clamping to the periphery of a rotatable circular form one end of a piece of channel stock which has had the channel legs pressed together for a short distance from the clamped end with the external channel bottom abutting the circular form periphery, inserting a bearing point guide wheel within the open channel with the wheel periphery engaging the inside channel bottom and at the same time inserting the channel legs into a forming block having tapering surfaces for closing the channel legs as the circular form is rotated, rotating the circular form and thereby closing the channel legs and bending the closed channel into a hollow annulus of diameter determined by the peripheral diameter of the circular form and having overlapping ends.

12. The method of making the stress equalizing ring element of claim 5 wherein the step of forming the elongated member into a hollow annulus includes the steps of, clamping to the periphery of a rotatable circular form one end of an elongated hollow member of generally teardrop cross-section having an intermediate curved wall merging into a pair of facing converging planar sides with the intermediate wall abutting the circular form periphery, inserting the planar sides of the elongated member into a complementally apertured guiding block and complementally formed bearing point guide wheel, rotating the circular form and thereby bending the elongated member into a hollow annulus of diameter determined by the peripheral diameter of the circular form and having overlapping ends.

13. The method of making the stress equalizing ring element of claim 11 wherein the step of cutting the annulus includes the steps of, clamping the annulus closely around a circular form of the same diameter as that used in the annulus forming step with the ends overlapped, and cutting through both of the overlapped ends along a radius of the annulus.

14. The method of making the stress equalizing ring element of claim 11 wherein the step of securing the circular band to the toroid outer periphery includes the steps of, clamping the cut annulus closely around a circular form of the same diameter as that used in the annulus forming step, forming the circular band by bending the long axis of a rectangular strap around the toroid outer periphery so that the band ends meet at a point substantially diametrically opposite the radial split in the toroid, clamping the band to the toroid in such position that the median planes of the toroid and circular band substantially coincide and the toroid median plane is substantially perpendicular to the inside surface of the circular band, tack welding the circular band to the outer periphery of the toroid on both side walls, and then finish welding the circular band to the outer periphery.

15. The method of making the stress equalizing ring element of claim 11 wherein the step of cutting the annulus includes the steps of, clamping the annulus closely around a circular form of the same diameter as that used in the annulus forming step with the ends overlapped, and cutting through both of the overlapped ends along a radius of the annulus, and wherein the step of securing the circular band to the toroid outer periphery includes the steps of, clamping the cut annulus closely around a circular form of the same diameter as that used in the annulus forming step, forming the circular band by bending the long axis of a rectangular strap around the toroid outer periphery so that the band ends meet at a point substantially diametrically opposite the radial split in the toroid, clamping the band to the toroid in such position that the median planes of the toroid and circular band substantially coincide and the toroid median plane is substantially perpendicular to the inside surface of the circular band, tack welding the circular band to the outer periphery of the toroid on both side walls, and then finish welding the circular band to the outer periphery.

16. The method of making the stress equalizing ring element of claim 12 wherein the step of cutting the annulus includes the steps of, clamping the annulus closely around a circular form of the same diameter as that used in the annulus forming step with the ends overlapped, and cutting through both of the overlapped ends along a radius of the annulus.

17. The method of making the stress equalizing ring element of claim 12 wherein the step of securing the circular band to the toroid outer periphery includes the steps of, clamping the cut annulus closely around a circular form of the same diameter as that used in the annulus forming step, forming the circular band by bending the long axis of a rectangular strap around the toroid outer periphery so that the band ends meet at a point substantially diametrically opposite the radial split in the toroid, clamping the band to the toroid in such position that the median planes of the toroid and circular band substantially coincide and the toroid median plane is substantially perpendicular to the inside surface of the circular band, tack welding the circular band to the outer periphery of the toroid on both side walls, and then finish welding the circular band to the outer periphery.

18. The method of making the stress equalizing ring element of claim 12 wherein the step of cutting the annulus includes the steps of, clamping the annulus closely around a circular form of the same diameter as that used in the annulus forming step with the ends overlapped, and cutting through both of the overlapped ends along a radius of the annulus, and wherein the step of securing the circular band to the toroid outer periphery includes the steps of, clamping the cut annulus closely around a circular form of the same diameter as that used in the annulus forming step, forming the circular band by bending the long axis of a rectangular strap around the toroid outer periphery so that the band ends meet at a point substantially diametrically opposite the radial split in the toroid, clamping the band to the toroid in such position that the median planes of the toroid and circular band substantially coincide and the toroid median plane is substantially perpendicular to the inside surface of the circular band, tack welding the circular band to the outer periphery of the toroid on both side walls, and then finish welding the circular band to the outer periphery.

References Cited in the file of this patent

UNITED STATES PATENTS 310,286   Knipe _____ Jan. 6, 1885

(Other references on following page)

UNITED STATES PATENTS

| | | |
|---|---|---|
| 677,142 | Richardson et al. | June 25, 1901 |
| 866,506 | Naysmith | Sept. 17, 1907 |
| 1,661,878 | Cromwell | Mar. 6, 1928 |
| 1,753,586 | Warwick | Apr. 8, 1930 |
| 1,970,694 | Fischer | Aug. 21, 1934 |
| 2,062,591 | Mather | Dec. 1, 1936 |
| 2,143,443 | Kelso | Jan. 10, 1939 |
| 2,470,036 | Lemay | May 10, 1949 |
| 2,573,530 | Zallea et al. | Oct. 30, 1951 |
| 2,656,594 | Westling | Oct. 27, 1953 |
| 2,737,707 | Highet et al. | Mar. 13, 1956 |
| 2,800,867 | Smith | July 30, 1957 |
| 2,818,636 | Fentress et al. | Jan. 7, 1958 |
| 2,846,968 | Tipton | Aug. 12, 1958 |

FOREIGN PATENTS

| | | |
|---|---|---|
| 501,221 | France | Apr. 9, 1920 |